United States Patent [19]

Skutecki et al.

[11] Patent Number: 4,460,964
[45] Date of Patent: Jul. 17, 1984

[54] MULTIAXIS HARDOVER PROTECTION APPARATUS FOR AUTOMATIC FLIGHT CONTROL SYSTEMS

[75] Inventors: Edmund R. Skutecki, Glendale; Carl D. Griffith, Phoenix; Robert A. Bowie, Glendale, all of Ariz.

[73] Assignee: Sperry Corporation, New York, N.Y.

[21] Appl. No.: 297,531

[22] Filed: Aug. 31, 1981

[51] Int. Cl.³ .................... G06F 15/50; G06G 7/78
[52] U.S. Cl. .................... 364/434; 244/17.13; 244/177
[58] Field of Search .................... 364/434; 244/17.13, 244/177, 181, 193; 73/178 H

[56] References Cited

U.S. PATENT DOCUMENTS

| | | | |
|---|---|---|---|
| 3,848,833 | 11/1974 | Rauschelbach | 364/434 |
| 3,887,921 | 6/1975 | Spratt et al. | 244/193 |
| 3,981,442 | 9/1976 | Smith | 364/434 |
| 4,129,275 | 12/1978 | Gerstine et al. | 364/434 |
| 4,382,283 | 5/1983 | Cleford et al. | 364/434 |
| 4,385,355 | 5/1983 | Verzella et al. | 244/17.13 |
| 4,385,356 | 5/1983 | Verzella et al. | 364/434 |

Primary Examiner—Gary Chin
Attorney, Agent, or Firm—Howard P. Terry; Albert B. Cooper

[57] ABSTRACT

A hybrid analog/digital autopilot utilizing analog inner loops in each control axis of the aircraft and a digital processor for providing outer loop commands and inner loop gain augmentation commands to the inner loops. The command from the processor to each inner loop is buffered by an adaptive rate limit circuit that initially transmits high frequency commands and over a predetermined time interval limits the command rate to a safe low value. Alternatively, the adaptive rate limit buffer transmits the high frequency command up to a predetermined attitude limit and thereafter transmits a command limited to a low safe rate.

15 Claims, 5 Drawing Figures

MULTIAXIS HARDOVER PROTECTION APPARATUS FOR AUTOMATIC FLIGHT CONTROL SYSTEMS

BACKGROUND OF THE INVENTION

1. Field of the Invention

The invention relates generally to automatic flight control systems particularly with respect to hybrid digital/analog autopilots.

2. Description of the Prior Art

Aircraft automatic flight control systems have been developed over the past decades to achieve a high degree of sophisticated performance providing exceedingly complex functionality. Generally such systems have been developed utilizing analog components and circuitry. Typically an automatic flight control system comprises a plurality of inner loops associated with the respective control axes of the aircraft and an outer loop system generally with independent electronic circuitry for each aircraft axis. In fixed wing aircraft control is effected with respect to the pitch, roll and yaw axes and in helicopters control is effected with respect to the cyclic pitch and roll axes, the yaw axis and the collective pitch control axis.

Basically the inner loop of the autopilot is comprised of an aircraft attitude sensor such as a pitch or roll gyro providing an attitude signal which is combined with an attitude command from the outer loop to provide an inner loop attitude error signal. The error signal is applied as the input to the servo system that positions the associated attitude control member of the aircraft. The inner loop controls the attitude of the aircraft with respect to the attitude reference signals from the outer loop so as to drive the inner loop error signal to null.

In performing its stability augmentation function the inner loop responds to generally high frequency, short duration signals due for example to gust disturbances or aircraft structural modes. Typically automatic flight control systems have requirements for altering the gain of the analog inner loop in accordance with a complex gain program as a function of, for example, airspeed, autopilot mode and the like as is well known in the art. Conventionally, expensive dedicated hardware is utilized for performing the gain programming function.

In such prior art systems erroneous commands due, for example, to hardover failures are generally limited to failure in a single control axis because of the independence of the autopilot control circuitry with respect to the aircraft axes. Conventionally hardover failure is mitigated for the various aircraft control axes by torque limiting, authority limiting, rate limiting or magnitude limiting techniques.

Heretofore full capability, sophisticated, automatic flight control systems have been too complex and expensive for other than the large commercial transport type aircraft operators. Smaller fixed wing aircraft such as executive aircraft and helicopters have generally been precluded from utilizing other than limited capability autopilots. With the development of digital microprocessors for use in autopilots, a level of sophistication in autopilot functionality can be achieved comparable to full capability analog autopilots but with considerably less equipment, weight, bulk and expense than that required for the analog systems. In an all digital autopilot the computer provides all of the processing for the inner and outer loops of the autopilot. In order to assure that processor failures result in only single axis failures, a separate processor is required for each axis. For example, for helicopter control four separate processors may be required. Such multiple processor systems are exceedingly complex in hardware and software requiring individual CPU's, memories and input/output systems. Such multiprocessor systems are hence very expensive rendering them unavailable for use in other than large commercial transports.

A technique for providing a relatively inexpensive automatic flight control system with sophisticated functionality for general aviation use in fixed wing aircraft such as executive aircraft and helicopters is to provide a hybrid analog/digital autopilot utilizing an analog inner loop for each control axis and a single digital processor for providing the command to the plurality of analog inner loops. If the processor in such a system should fail, simultaneous hardover failures in all aircraft axes can occur which may precipitate exceedingly dangerous situations. A solution to this problem is to utilize a fixed rate limit on each command provided by the processor to the inner loops. In this manner only slowly changing commands are applied to the inner loops, although the processor may be outputting erroneous hardover signals in each axis.

This arrangement, however, precludes processing high frequency signals such as stabilization signals via the processor. The gain scheduling function of the inner loops would therefore still require dedicated expensive hardware for the purpose.

SUMMARY OF THE INVENTION

The present invention obviates the disadvantages of the prior art as discussed above in a hybrid analog/digital autopilot with analog inner loops for each control axis and a single digital processor for providing outer loop commands to the inner loops. The digital processor provides inner loop gain augmentation with gain adjustable under processor control. The inner loop augmentation involves high frequency stabilization signals. The command from the processor is applied to each inner loop through an adaptive rate limiter device that initially transmits high rate or high frequency signals and thereafter limits the command to a safe low rate. In one embodiment of the invention high rate signals are transmitted for a short time interval and thereafter the command is limited to the low rate. In an alternative embodiment the processor command is transmitted unaltered up to a predetermined magnitude limit and above the limit the command is transmitted at a safe limited rate.

In this manner short duration, low amplitude, high frequency stabilization signals are transmitted from the processor to the inner loop for, for example, stability augmentation purposes. A hardover failure of the processor, however, will in a short, safe time interval or alternatively above a safe magnitude be limited to a safe low rate.

DESCRIPTION OF THE PREFERRED EMBODIMENTS

Figure 1:
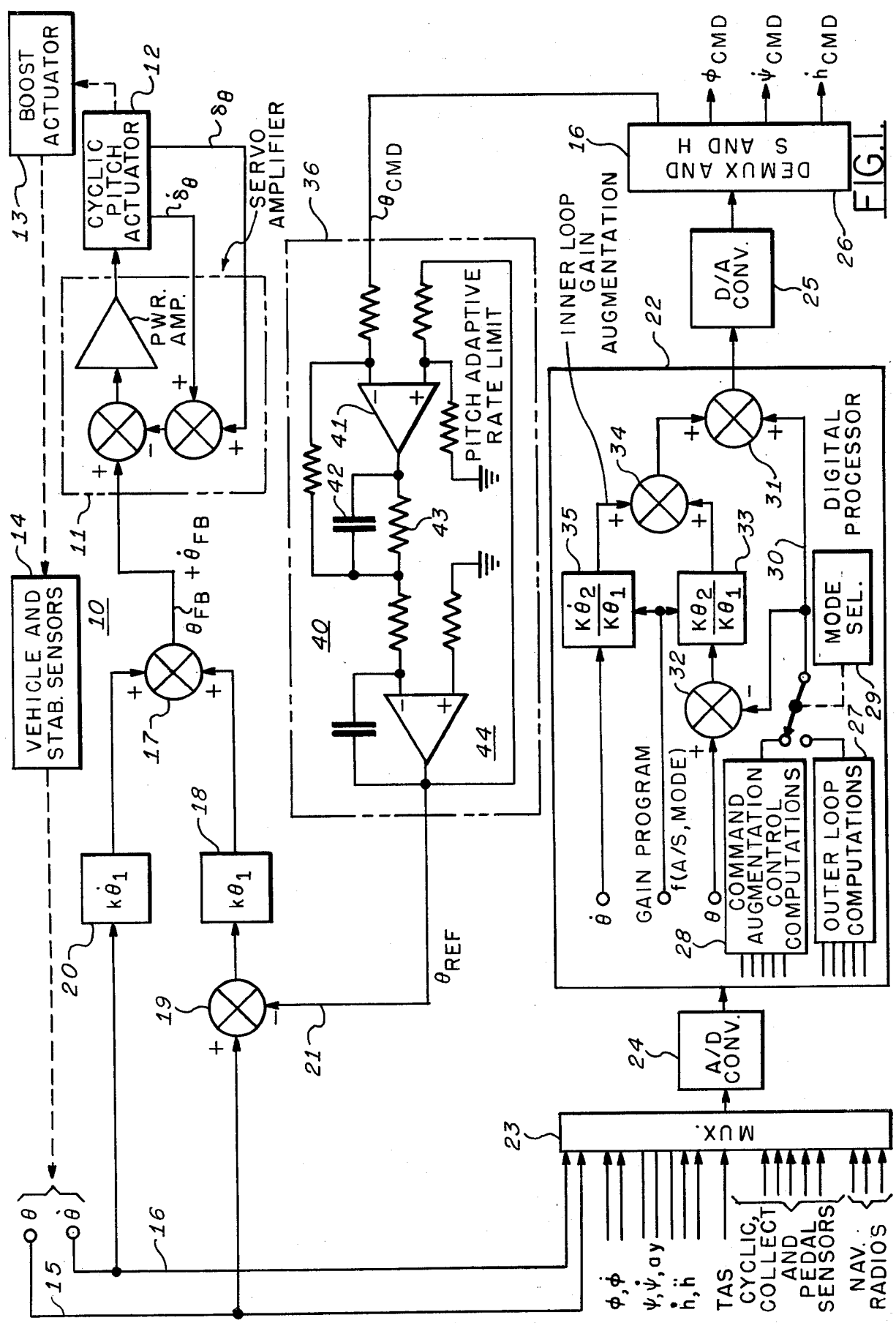
FIG. 1 is a schematic block diagram of a portion of a hybrid analog/digital autopilot utilizing one embodiment of the present invention.

Referring to FIG. 1, a portion of a hybrid analog/digital autopilot is illustrated. For the purposes of explanation a helicopter autopilot is considered and particularly with respect to control in the cyclic pitch axis thereof. The autopilot of FIG. 1 includes an analog inner loop 10 for providing control about the pitch axis of the aircraft. The inner loop 10 includes a servo amplifier 11 that drives the cyclic pitch actuator 12 of the aircraft. The cyclic pitch actuator 12 drives a conventional boost actuator 13 that positions the swash plate of the helicopter. Displacement and rate feedback are provided from the actuator 12 to the servo amplifier 11 in a conventional manner. The aircraft, denoted at 14, is controlled in attitude about its pitch axis in response to the boost actuator 13. Stabilization sensors such as pitch attitude and, perhaps, pitch rate gyros provide inner loop pitch attitude feedback and pitch rate feedback signals on leads 15 and 16 respectively. The pitch attitude signal on the lead 15 is applied as an input to a summing junction 17 via a gain $K\theta_1$ 18 and a further summing junction 19. The pitch rate feedback signal on the lead 16 is applied to the summing junction 17 via a gain 20 that provides the gain factor $K\dot{\theta}_1$. The total inner loop feedback is provided by the summing junction 17 to the servo amplifier 11. It is appreciated that the summing junction 17 provides the error signal for the inner loop 10.

The attitude command to the inner loop 10 is applied to the summing junction 19 via a lead 21. The pitch inner loop attitude command is denoted as $\theta_{REF}$. In operation the inner loop 10 controls the aircraft 14 to assume the pitch attitude commanded by the $\theta_{REF}$ signal on the lead 21. In a conventional manner the inner loop 10 provides stability augmentation by controlling the aircraft to return to the $\theta_{REF}$ pitch attitude when displaced by, for example, gust disturbances. The stability augmentation signals are generally of a high frequency and short duration. It is appreciated that each control axis of the aircraft is provided with an analog inner loop similar to the inner loop 10.

The autopilot of FIG. 1 includes a digital processor 22 for providing command augmentation and outer loop computations to the inner loop 10 as well as to the other inner loops of the system. The processor may also be used to provide structural mode stabilization with respect, for example, to the body bending modes. Such stabilization signals are of high frequency and short duration. Additionally, the processor 22 provides inner loop gain augmentation with respect to each of the inner loops of the autopilot. The I/O system for the processor 22 includes an input multiplexer 23 for receiving analog signals and an analog-to-digital converter 24 for converting the signals from the multiplexer 23 into digital format for inputing into the processor 22. The I/O of the processor 22 further includes a digital-to-analog converter 25 for converting the digital output of the processor 22 to analog format and an output demultiplexer and sample and hold system 26 for demultiplexing the various processor outputs and for providing the analog signals to the inner loops of the autopilot.

The multiplexer 23 receives the pitch attitude and pitch rate inner loop feedback signals on the leads 15 and 16 respectively to provide gain augmentation for the inner loop 10 in a manner to be explained. The multiplexer 23 also receives roll attitude and roll rate inner loop feedback signals ($\phi$, $\dot{\phi}$) for augmenting the gain of the roll axis inner loop (not shown) of the autopilot. For yaw axis inner loop gain augmentation the multiplexer 23 receives inner loop feedback signals of heading, heading rate, and lateral acceleration ($\psi$, $\dot{\psi}$, $a_y$). Collective axis inner loop gain augmentation may be effected by inner loop feedbacks of vertical velocity and vertical acceleration. Accordingly, the signals ($\dot{h}$, $\ddot{h}$) are applied as inputs to the multiplexer 23.

The multiplexer 23 receives, inter alia, a true airspeed signal (TAS); cyclic and collective stick sensor signals and pedal sensor signals and navigation radio inputs. The true airspeed signal is utilized by the processor 22 to provide gain scheduling with respect to the analog inner loops of the system. The stick and pedal sensor signals are utilized for command augmentation computations and the navigational radio inputs are utilized in navigational outer loop computations to provide outer loop commands to the inner loops.

The digital processor 22 provides attitude commands as well as inner loop gain augmentation to the inner loops. The pertinent functions performed by the processor 22 are schematically illustrated as computation blocks within the processor. The processor 22 provides outer loop computations 27 which provide attitude commands to the inner loops in accordance with navigation data, altitude data, path control data and the like in a conventional manner. The processor 22 also provides conventional command augmentation control computations 28 when the autopilot is in a stability augmentation mode (SAS). The autopilot mode is selected by a mode selector 29 which is generally under pilot control. The command augmentation or outer loop attitude reference is schematically illustrated as applied via a lead 30 and a summing point 31 to the digital-to-analog converter 25.

The processor 22 also provides inner loop augmentation with respect to the plurality of inner loops of the autopilot. For purposes of description, only the cyclic pitch inner loop gain augmentation is illustrated. Accordingly, the pitch attitude signal $\theta$ (on the line 15 via the I/O 23, 24) is combined at a summing point 32 with the pitch attitude reference on the line 30 to provide the difference therebetween. The difference provided from the summing point 32 comprises the gain augmentation inner loop error signal. The error signal is scaled at 33 by a factor $K\theta_2/K\theta_1$. The scaled inner loop error signal is applied via a summing point 34 for summation by the summing point 31 with the attitude reference on the line 30. The processor 22 also augments the pitch rate gain portion of the inner loop control by scaling the pitch rate signal $\dot{\theta}$ at 35 by a scaling factor $K\dot{\theta}_2/K\dot{\theta}_1$. The scaled pitch rate signal is summed with the scaled attitude error signal at 34 to provide the total inner loop gain augmentation signal to the summing point 31 whereat it is combined with the attitude reference on the lead 30. The gains 33 and 35 may be altered under processor control by an appropriate gain program as a function of, for example, airspeed, autopilot mode and the like.

The pitch attitude command provided by the summing point 31 and comprised of the attitude reference generated by the outer loop computations 27 or the command augmentation stabilization control computations 28 and the inner loop gain augmentation from the summing point 34 is provided as $\theta_{CMD}$ via the digital-toanalog converter 25 and the demultiplexer 26. In a similar manner the processor 22 generates attitude commands and inner loop gain augmentation signals with respect to the roll axis, the yaw axis and the collective pitch axis, these signals being provided to the respective inner loops by the demultiplexer 26 as $\phi_{CMD}$, $\psi_{CMD}$ and $\dot{h}_{CMD}$, respectively. The computations illustrated schematically within the processor 22 are implemented by conventional software readily derived by a routineer skilled in the art. The processor 22 is of conventional design, many suitable computer arrangements being known in the art for implementing the present autopilot.

In accordance with the invention, the $\theta_{CMD}$ command is applied through a pitch adaptive rate limit buffer 36 to the summing junction 19 of the pitch inner loop 10. The adaptive rate limit circuit 36 transmits the high rate commands required for inner loop stabilization but only for a short period of time. Thereafter, irrespective of the magnitude of the command, the rate limit circuit 36 transmits the command at a safe low rate. The $\theta_{CMD}$ command signal applied to the summing junction 19 of the inner loop 10 is comprised of a long term pitch attitude reference provided from the outer loop computations 27 or the command augmentation control computation 28 and short duration, high frequency signals such as those provided by the inner loop gain augmentation for stability augmentation as well as the high frequency portion of the command augmentation computations due to, for example, pilot actuation of the aircraft control sticks and pedals. In a manner to be explained, the long term attitude reference component of $\theta_{CMD}$ is applied via the rate limit 36 to the inner loop 10 to control the pitch attitude of the aircraft and the high frequency components are transmitted to effect the SAS function as well as control wheel steering. A hardover command, however, over a predetermined time interval, for example, 0.5 seconds, is applied to the inner loop 10 at a safe, low rate. Alternatively, the hardover command is limited to the safe, low rate after a predetermined magnitude.

The pitch adaptive rate limit 36 comprises a first stage 40 including an operational amplifier 41, a capacitor 42 shunting a resistor 43, the capacitor 42 and resistor 43 forming a capacitor-resistor network in the feedback of the operational amplifier 41. The output of the first stage 40 of the rate limit circuit 36 is applied as the input to an integrator 44. The output of the integrator 44 is connected in feedback fashion to an input of the operational amplifier 41 and also provides the $\theta_{REF}$ signal to the summing junction 19 of the inner loop 10. Under quiescent conditions the $\theta_{REF}$ signal from the integrator 44 is equal to the $\theta_{CMD}$ input to the amplifier 41. The feedback from the integrator 44 to the input of the amplifier 41 results in equal and opposite signals at the input of the amplifier 41 and the output of the amplifier 41 is therefore null. The null input to the integrator 44 does not effect any change in the integrator output. When $\theta_{CMD}$ changes, the resulting output from the first stage 40 causes the output of the integrator 44 to increase or decrease linearly at a rate dependent upon the magnitude of the output of the first stage 40. In the pitch axis illustrated, the gains of the elements of the circuit 36 and the time constant of the integrator 44 are chosen such that full saturation voltage of the amplifier 41 results in the output of the integrator 44 changing at the maximum rate limit for the axis. The full saturation voltage of the amplifier 41 is typically 12 volts and in the pitch axis the gains and time constants are chosen such that full saturation voltage of the amplifier 41 corresponds to an attitude command rate of 7 or 8 degrees/sec.

When $\theta_{CMD}$ initially changes, the capacitor 42 provides a short circuit with respect to high frequency, short duration signals shorting the resistor 43 and permitting the output voltage of the first stage 40 to attain the full saturation voltage. When the first stage 40 provides the full saturation voltage to the integrator 44, the output of the integrator 44 slews at the maximum rate, thereby commanding an attitude term which changes at the maximum rate limit. Thus for short duration high frequency signals, the output $\theta_{REF}$ can follow the input $\theta_{CMD}$ up to the predetermined maximum rate limit. If, however, the $\theta_{CMD}$ signal persists, as for example, during a hardover failure, the capacitor 42 discharges through the resistor 43, effectively becoming an open circuit, placing the resistor 43 into a voltage divider relationship with the amplifier 41 thus dropping the full saturation voltage output of the first stage 40 to a low value. The capacitor 42 in shunt with the resistor 43 effects a variable ratio voltage divider with respect to the operational amplifier 41 thus providing a variable gain circuit which has an initial high gain and thereafter a lower gain.

The low voltage output of the first stage 40 results in the integrator 44 slewing at a lower safe rate, thus softening the affect of any hardover failure. In the pitch axis the value of the resistor 43 is chosen to drop the voltage to approximately 3 volts which is the equivalent of $\theta_{REF}$ slewing at approximately 2 degrees/sec. The time constant of the RC network of which the capacitor 42 is a part is approximately 0.5 seconds so that for commands that persist for longer than 0.5 seconds, the rate of change of $\theta_{REF}$ is limited to a low safe value. It is appreciated that the high frequency SAS commands and normal autopilot high frequency maneuvering commands from the processor 22 generally occur in less than 0.5 seconds in the cyclic pitch axis.

Figure 2:
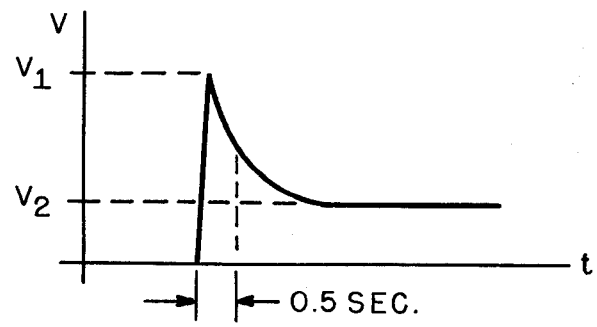
FIGS. 2 and 3 are waveform diagrams useful in explaining the operation of the embodiment of FIG. 1.
Figure 3:
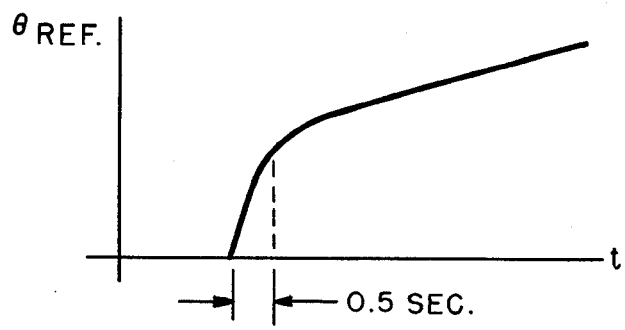

Referring for the moment to FIG. 2, the output response of the first stage 40 to a saturating command is illustrated. Initially in response to the command, the output of the first stage 40 rapidly attains the saturation voltage $V_1$ and over a predetermined time interval decays to a lower voltage $V_2$. The effect of this response of the first stage 40 on the integrator 44 is illustrated in FIG. 3. Initially in response to the voltage $V_1$, the integrator 44 slews at a high rate which may be the maximum rate limit for the saturation voltage of the first stage 40. After the predetermined time interval when the first stage 40 output decays to $V_2$, the integrator 44 slews at the low safe rate.

Referring again to FIG. 1, it is appreciated that full inner loop gain control is maintained by the digital processor 22 when utilizing the present invention. The computer gain program responsive to I/O inputs changes the gains 33 and 35 so as to place the rate and attitude inner loop control law under processor control. This eliminates the complex dedicated gain scheduling hardware required in the absence of the present invention. For attitude disturbances of short duration, the total inner loop feedback is:

$$\theta_{FB} = \theta(K\theta_1 + K\theta_2)$$

$$\dot{\theta}_{FB} = \dot{\theta}(K\dot{\theta}_1 + K\dot{\theta}_2)$$

Thus the processor 22 can vary the gain of the inner loop 10 in accordance with flight condition requirements over the flight envelope of the aircraft over a wide range by varying the sign and magnitude of the gain constants $K\theta_2$ and $K\dot{\theta}_2$.

As discussed above, for the helicopter for which the system illustrated in FIG. 1 was designed, the pitch adaptive rate limit circuit 36 initially transmits an attitude reference at up to 8 degrees/sec and thereafter at a low safe rate of approximately 2 degrees/sec. In the roll axis for the particular system illustrated, an acceptable high rate limit is 15 degrees/sec and a low safe rate limit is 8 degrees/sec. In circumstances where the adaptive rate limit circuit is required to initially transmit an extremely high bandwidth, i.e., where the initial slope of the adaptive rate limit response is extremely steep, and consequently the time constant diminishes toward zero, the circuit performance may deteriorate because of component values and tolerances. Such a high bandwidth may be required for stability augmentation when high frequency aircraft structural modes are involved.

Figure 5:
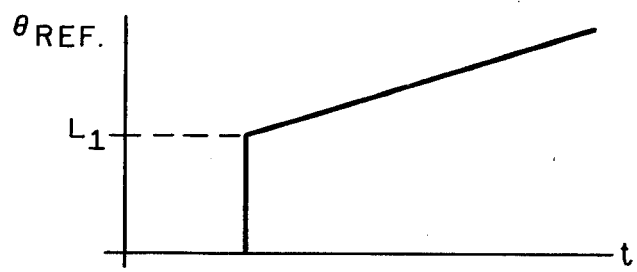
FIG. 5 is a waveform diagram useful in explaining the operation of the embodiment of FIG. 4.
Figure 4:
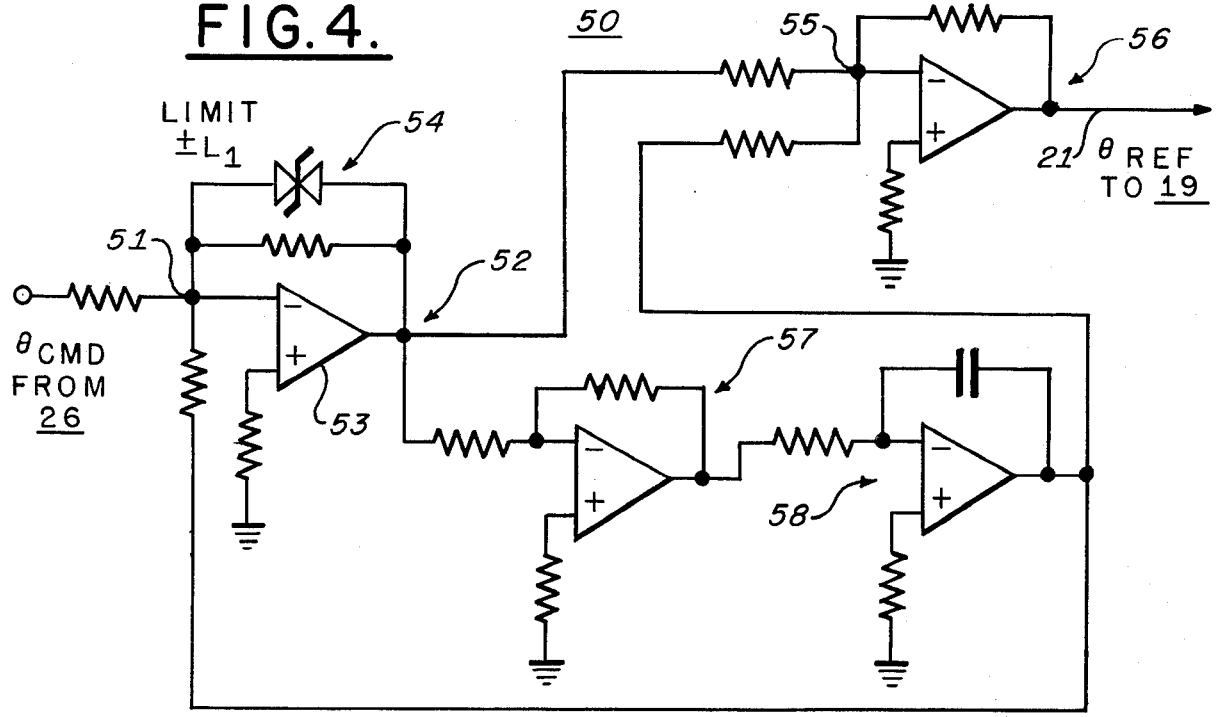
FIG. 4 is a schematic diagram illustrating an alternative embodiment of the invention.

In order to accommodate these requirements an alternative embodiment of the adaptive rate limit is provided in FIG. 4 where the alternative embodiment has the response illustrated in FIG. 5. Referring to FIG. 5, initially an infinite rate is transmitted at a zero time constant up to an attitude limit of $L_1$. When the command exceeds the limit, the command is therefore transmitted at a low safe rate. In the cyclic pitch axis the limit $L_1$ may be set to a nominal value of ±2 degrees. In roll $L_1$ may be set to ±5 degrees. The safe low rate transmitted by the adaptive rate limit after the limit $L_1$ is exceeded may be the same values given above with respect to the embodiment of FIG. 1. For pitch the safe low rate may be one to two degrees/second and for roll, approximately 8 degrees/second.

Referring to FIG. 4, a schematic block diagram of a pitch adaptive rate limit circuit 50 providing the response of FIG. 5 is illustrated. It is appreciated that the rate limit circuit 50 is directly substitutable for the rate limit circuit 36 of FIG. 1. The $\theta_{CMD}$ command from the demultiplexer 26 is applied through a summing junction 51 as the input to an operational amplifier limiter 52. The limiter 52 is comprised of an operational amplifier 53 and a zener diode limiter 54. The zener diode limiter 54 sets the limit $\pm L_1$ discussed above with respect to FIG. 5. The parameters of the circuit 50 are scaled whereby the limit voltage $\pm L$ results in a pitch command of ±2 degrees.

The output of the limiter circuit 52 is applied through a summing junction 55 as an input to an operational amplifier 56. The output of the operational amplifier 56 provides the pitch inner loop command $\theta_{REF}$ to the summing junction 19 of the inner loop 10 (FIG. 1). The output of the limiter 52 is also provided via an inverting amplifier 57 as the input to an integrator 58. The output of the integrator 58 is provided to both of the summing junctions 51 and 55.

Quiescently $\theta_{CMD}$ is applied to the summing junction 51 and the integrator 58 stores an equal and opposite value which subtracts from $\theta_{CMD}$ applying zero input to the amplifier 53. The output of the amplifier 53 is consequently zero, which applies zero input to the integrator 58. The equal and opposite value of $\theta_{CMD}$ at the output of the integrator 58 is provided via the summing junction 55 and the inverting amplifier 56 to provide $\theta_{REF}$ that is equal to $\theta_{CMD}$. The gain of the amplifier 57 and the time constant of the integrator 58 is set whereby when the limit voltage $L_1$ is applied to the amplifier 57, the integrator 58 slews at the safe low rate illustrated in FIG. 5. When any voltage less than $L_1$ is applied to the amplifier 57, the integrator 58 slews at an even slower rate.

In effect the quiescent output of the integrator 58 provides a bias or trim point to the summing junction 51 around which the circuit operates. Any change in $\theta_{CMD}$ within the limit $\pm L_1$ is transmitted unaltered via the amplifier 56 to the lead 21. Thus for high rate changes in the attitude command $\theta_{CMD}$ that are within the limit $\pm L_1$, the commands are transmitted directly to the lead 21. To whatever extent the reference level provided by the integrator 58 changes, this change is not reflected in the $\theta_{REF}$ signal since the output of the integrator 58 is connected to both the summing junctions 51 and 55. For a long term change in the attitude reference $\theta_{CMD}$ within the limit $\pm L$, as the output of the integrator 58 ramps toward the new attitude reference $\theta_{CMD}$ to null the input to the amplifier 53, the output of the integrator 58 replaces at the input to the amplifier 56 that portion of the attitude command being removed from the output of the limiter 52 as the voltage at the summing junction 51 approaches null. Thus the integrator 58 has the effect of slowly changing the trim reference point about which the amplifier 53 operates.

The output $\theta_{REF}$ can therefore track $\theta_{CMD}$ within the limit $\pm L_1$ for high frequency inputs. The output $\theta_{REF}$, however, is protected from persistent large magnitude changes in $\theta_{CMD}$ by the low safe rate limit. This is because for a change in $\theta_{CMD}$ that exceeds the limit $L_1$, the limiter 52 provides the limit voltage $L_1$ through the amplifier 56 to the output lead 21. In response to the $L_1$ voltage from the limiter 52, the integrator 58 slews at the safe low rate in a direction to null the input of the amplifier 53. When the integrator 58, slewing in this direction, attains a voltage equal to the trim point extant in the system prior to the persistent large magnitude change in $\theta_{CMD}$, plus the limit $L_1$, the output of the integrator 58 has reached the point $L_1$ on the curve of FIG. 5 and thereafter continues to provide $\theta_{REF}$ changing at the safe low rate limit.

Thus it is appreciated with respect to the rate limit 50 that a hardover failure will be limited to a rapid attitude change of $L_1$ and thereafter to a slow safe change until the pilot takes corrective action or until an external limit (not shown) is attained. For high frequency changes in $\theta_{CMD}$ the output of the integrator 58 remains essentially unchanged and $\theta_{REF}$ is equal to $\theta_{CMD}$ within the limits of $\pm L_1$.

It is appreciated from the foregoing that the present invention provides an inexpensive hybrid digital/analog autopilot that utilizes one digital processor to control all aircraft axes. The inner loop control laws are under processor control providing a significant functional advantage. A processor malfunction that otherwise would result in simultaneous hardover failure in all axes results in only an acceptable mild disturbance in each axis because of the adaptive rate limit buffers of the present invention.

The command from the processor to each analog inner loop is transmitted through an adaptive rate limit buffer as described above. Depending on the requirements of the system, the rate limit 36 may be used on some of the aircraft control axes and the circuit 50 on other control axes. In a particular embodiment of the invention the cyclic pitch and roll axes utilize the circuit 50 of FIG. 4 whereas in the collective axis the circuit 36 of FIG. 1 is utilized. The pitch adaptive rate limits of the present invention provide a softened response in each axis to a hardover failure of the processor 22.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A hybrid digital/analog automatic flight control system for control of an aircraft with respect to the control axes thereof comprising
    an analog inner loop associated with each control axis,
    digital processor means responsive to aircraft sensor signals for deriving command signals for said inner loops, and
    adaptive rate limit means for coupling command signals from said digital processor means to at least one of said associated inner loops such that rapidly changing command singals are transmitted unaltered prior to a predetermined limit and thereafter are transmitted at a limited lower rate.

2. The system of claim 1 in which said digital processor means includes means for augmenting the gain of at least one of said analog inner loops.

3. The system of claim 1 in which at least one of said control axes comprises an attitude control axis and said analog inner loop associated with said attitude control axis controls the attitude of said aircraft about said attitude control axis in accordance with the associated command provided from said digital processor means.

4. The system of claim 1 in which said predetermined limit of said adaptive rate limit means is a predetermined time interval.

5. The system of claim 1 in which said predetermined limit of said adaptive rate limit means is a predetermined magnitude of said command signal.

6. The system of claim 4 in which said adaptive rate limit means comprises
    variable gain means responsive to said command signals from said digital processor means for initially providing a first inner loop gain and after said predetermined time interval for providing a second inner loop gain lower than said first inner loop gain, and
    integrator means with an input coupled to said variable gain means and an output providing said command signals to said at least one associated analog inner loop,
    said integrator integrating at a first rate when said, variable gain means has said first gain and at a second rate lower than said first rate when said variable gain means has said second gain.

7. The system of claim 6 in which said variable gain means includes a summing amplifier responsive to said associated command signals from said processor means, said adaptive rate limit means further including a feedback connection from the output of said integrator means to the input of said summing amplifier means whereby the inputs to said summing amplifier means tends to be equal and opposite and the output thereof tends toward null.

8. The system of claim 6 in which said variable gain means comprises an operational amplifier, a capacitor and a resistor, said capacitor and resistor forming a parallel network in feedback relationship with respect to said operational amplifier, said capacitor initially providing a short circuit shunting said resistor to provide said first gain and after discharging in said predetermined time interval placing said resistor in voltage divider relationship with respect to said operational amplifier means to provide said second gain.

9. The system of claim 5 in which said adaptive rate limit means comprises
    magnitude limiting means responsive to said command signals from said digital processor means for providing output signals having magitudes limited to said predetermined command signal magnitude,
    output means responsive to said output signals of said magnitude limiting means for transmitting said command signals with magnitudes up to said predetermined command signal magnitude, and for providing said command signals to said at least one associated analog inner loop, and
    integrator means coupled to said magnitude limiting means and to said output means for providing said command signals with magnitudes above said predetermined command signal magnitude at said predetermined lower rate.

10. The system of claim 9 in which
    said magnitude limiting means comprises an operational amplifier magnitude limiter with a summing input arrangement responsive to said command, signals,
    said output means comprises a summing operational amplifier coupled to the output terminal of said operational amplifier limiter, and
    said integrator means has an output terminal coupled to said summing operational amplifier and to said summing input of said operational amplifier limiter whereby the output signal of said integrator reduces the input to said operational amplifier limiter to drive the output signal thereof to a null.

11. The system of claim 3 in which said digital processor means includes means for augmenting the gain of said analog inner loop associated with said attitude control axis.

12. The system of claim 11 in which said analog inner loop comprises
    servo means for positioning the attitude control member of said aircraft that controls the attitude of said aircraft about said attitude control axis,
    attitude sensor means for sensing the attitude of said aircraft about said attitude control axis and providing an attitude signal in response thereto, and
    summing junction means responsive to said attitude signal and to said associated command from the associated adaptive rate limit means for providing the difference therebetween,
    said difference signal from said summing junction means being coupled to the input of said servo means to provide the error signal for said inner loop.

13. The system of claim 12 in which said digital processor means includes
    means for receiving said attitude signal from said attitude sensor,
    means for generating an attitude command,
    means for subtracting said attitude signal and said attitude command thereby providing an attitude error,
    means for multiplying said attitude error by a processor controlled gain constant, and means for adding said gain adjusted attitude error to said attitude command thereby providing said command for the associated inner loop.

14. The system of claim 13 in which said inner loop further includes rate sensor means for sensing the rate of change of attitude of said aircraft about said attitude control axis and providing an attitude rate signal in accordance therewith, and means for combining said rate signal with said attitude signal to provide said inner loop error signal.

15. The system of claim 14 in which said digital processor means further includes means for receiving said rate signal, means for multiplying said rate signal by a processor controlled gain constant, and means for combining said gain adjusted rate signal with said attitude command.

* * * * *